United States Patent [19]

Rizzelli et al.

[11] 4,395,432

[45] Jul. 26, 1983

[54] β-ALUMINA COATING

[75] Inventors: Frank D. Rizzelli; Kimon Papadopoulos, both of Pittsburgh, Pa.

[73] Assignee: Westinghouse Electric Corp., Pittsburgh, Pa.

[21] Appl. No.: 331,107

[22] Filed: Dec. 16, 1981

[51] Int. Cl.$^3$ .......................... B05D 1/08; B05D 5/12
[52] U.S. Cl. ................................. 427/34; 427/126.4; 427/422; 427/423
[58] Field of Search ............... 427/422, 423, 34, 126.4

[56] References Cited

U.S. PATENT DOCUMENTS

| 3,901,733 | 8/1975 | Toy | 427/34 X |
| 4,082,826 | 4/1978 | Iijima | 264/65 |
| 4,225,785 | 9/1980 | Ducos et al. | 250/336 |
| 4,244,986 | 1/1981 | Paruso et al. | 427/126.4 |

Primary Examiner—Shrive P. Beck
Attorney, Agent, or Firm—R. D. Fuerle

[57] ABSTRACT

Disclosed is a method of coating a substrate with β-alumina, a compound of alumina and an alkali metal oxide, while maintaining its electrically conductive properties. A powdered mixture is formed of the β-alumina and a carbonate of the alkali metal. The mixture is sprayed through a source of heat sufficient to melt it onto the substrate. A plasma spray torch can be used to melt spray the mixture.

10 Claims, No Drawings

β-ALUMINA COATING

BACKGROUND OF THE INVENTION

Beta-alumina is an alumina compound containing an alkali metal oxide, usually as sodium oxide. The sodium ions become highly mobile at about 300° C. which makes β-alumina useful as a solid electrolyte at moderately elevated temperatures. It can be used, for example, as a sodium membrane in a sodium sulfur battery. Articles of β-alumina have been made by extrusion, isostatic pressing, and slip casting. Coatings of β-alumina can be prepared by a sol-gel process or by firing an aqueous slurry of β-alumina. However, these processes for preparing β-alumina coatings are not entirely satisfactory because the sol-gel process is suitable only for making very thin coatings and the slurry process is very slow and requires the substrate to be heated, which may damage certain substrates. Attempts to form coatings of β-alumina using plasma spray torches have failed because the resulting coatings were non-conductive.

SUMMARY OF THE INVENTION

We have discovered a process for coating substrates with β-alumina while maintaining its electrically conductive properties. In our process the β-alumina is mixed with the carbonate of the alkali metal that is present in the β-alumina and the mixture is sprayed against the substrate. Unlike prior processes the process of this invention can rapidly form coatings on substrates without unduly heating the substrate. The coatings can be made as thick as desirable and, in the absence of internal stresses, the adherence of the coating to the substrate is excellent.

PRIOR ART

U.S. Pat. No. 4,225,785 discloses a process of plasma spraying a mixture of α and β-alumina in a sodium vapor.

U.S. Pat. No. 4,082,826 discloses a method of producing ion conductive porcelain from β-alumina mixed with a sodium salt.

DESCRIPTION OF THE INVENTION

The β-aluminas which are the subject of this invention are compounds of about 80 to about 95 mole percent $Al_2O_3$ and about 5 to about 20 mole percent $M_2O$, where M is sodium, lithium, potassium, or a mixture thereof. The formula for the β-aluminas can be given as $nM_2O \cdot (1-n)Al_2O_3$, where n is about 0.05 to about 0.2. Stoichiometric β-alumina has the formula $Na_2O \cdot 11Al_2O_3$. If M is lithium or potassium the β-alumina may need to contain a stabilizer, for example, of MgO, as is known in the art. It is preferable for M to be sodium as this form of β-alumina is most widely used.

In the first step of the process of this invention the β-alumina is mixed with a carbonate of sodium, lithium, potassium, or mixtures thereof. That is, the additive will have the formula $M_2CO_3$ where M is preferably the same alkali metal that is present in β-alumina. The mixture of the β-alumina and the carbonate should have a particle size of less than about 100 mesh as larger sized particles do not work well in the coating process. If insufficient carbonate is present the resulting β-alumina coating will not be sufficiently conductive, and too much carbonate is unnecessary and may contaminate the β-alumina coating. The mixture should consist of about 5 to about 20% by weight $M_2CO_3$ and about 80 to about 95% by weight β-alumina, and is preferably about 5 to about 10% by weight $M_2CO_3$ and about 90 to about 95% by weight β-alumina. The preferred practice is to blend the carbonate and the β-alumina together, screen the mixture to break up any lumps which may have formed, and then dry the mixture at about 100° C. for an hour to remove water which may interfere with the coating process.

The mixture may be coated onto the substrate by any process which melts the mixture and sprays it onto the substrate, such as a flame spray metallizing gun or a plasma spray torch. A plasma spray torch is preferred as it is more efficient and propels the mixture at a greater velocity which results in better adherence of the resulting coating to the substrate. In using a plasma spray torch the amperage, which partly controls the arc temperature, is adjusted for the particular powder being applied. If the temperature is too low the powder will not melt in the torch and if the temperature is too high the coating may not be conductive. The gas pressure and the powder feed rate of the plasma spray torch are adjusted so that the proper amount of powder is carried into the arc of the torch. If the gas pressure of the torch is too great the powder will not be melted in the arc and if the pressure is too low the powder will not be carried into the arc. If the powder feed rate is too low, the plasma spray torch will operate inefficiently and may overheat the substrate, and if the powder feed rate is too great not all of the powder will be melted in the torch and the torch may become clogged. A carrier gas, which is preferably argon, is required in operating the plasma spray torch to carry the powder into the arc. In a plasma spray torch, particles of the powder are entrained in a jet of the carrier gas which passes through the electric arc. This melts the particles which then strike and adhere to the substrate. The substrate is typically placed about 2 to about 3 inches away from the arc.

The process of this invention may be used to coat substrates of virtually any composition including silica glass, metals, and plastic. The substrate may be of almost any shape, but surfaces which are not accessible to the powder spray will not be coated. While coatings of almost any thickness can be built up, internal stresses in very thick coatings may result in cracking of the coating or in flaking of the coatings from the substrate. Coatings can be made more uniform in thickness if desired by grinding or other technique. The resulting coated substrate may be used in fuel cells, batteries, laboratory test work, and other applications.

The following example further illustrates this invention.

EXAMPLE

Two grades of β-alumina were obtained - an unground calcined β-alumina having a particle size specification of +100, 12%; +200, 69%, and +325, 87%, and a superground β-alumina which did not have a mesh size specified but was said to be close to the individual crystallite size. Each grade of alumina was mixed with sodium carbonate so that the sodium carbonate constituted 8 wt. % of the mixture. The mixtures were then sprayed onto a substrate using a plasma spray torch operated at 550 amps, an argon gas pressure of 60 psig and a feed rate setting of 30. The substrate was a silica glass tube 12 inches long and 1 inch in diameter which was placed 2 to 3 inches from the arc and was rotated at a rate of 100 revolutions per minute. As a control, each grade of β-alumina was also plasma sprayed without being first mixed with sodium carbonate. The coatings formed from the β-alumina which had not been mixed with sodium carbonate showed no conductivity for the unground calcined β-alumina and only slight conductivity for the superground β-alumina. The coatings formed from the β-alumina which had been mixed with sodium carbonate showed slight conductivity for the unground material and a dramatically improved conductivity for the superground material. The coatings averaged about ½ millimeter in thickness. All coatings appeared to be mechanically quite strong. Specimens of the silica glass with the β-alumina coating on it were cut with a diamond saw and there was no tendency for the β-alumina coating to flake off near the cuts. When an inch-long specimen was accidentally dropped the silica glass cracked, but the surrounding β-alumina layer remained intact.

We claim:

1. A method of coating a substrate with β-alumina, a compound of alumina and an alkali metal oxide, comprising:
   (1) forming a powdered mixture of about 80 to about 95% by weight β-alumina and about 5 to about 20% by weight of a carbonate of an alkali metal; and
   (2) spraying said powdered mixture through a source of heat sufficient to melt it, and onto said substrate.

2. A method according to claim 1 wherein said β-alumina is a compound of about 80 to about 95 mole percent $M_2O$ and about 5 to about 20 mole percent $Al_2O_3$, where M is selected from the group consisting of Na, Li, K, and mixtures thereof.

3. A method according to claim 2 wherein M is Na.

4. A method according to claim 1 wherein said mixture comprises about 5 to about 10% by weight of said carbonate and about 90 to about 95% by weight β-alumina.

5. A method according to claim 1 wherein said mixture has a particle size less than 100 mesh.

6. A method according to claim 1 wherein said mixture is heated with a plasma spray torch.

7. A method according to claim 1 wherein the alkali metal in said carbonate is the same alkali metal that is in said β-alumina.

8. A method of coating a substrate with a compound having the general formula $nM_2O \cdot (1-n)Al_2O_3$ where n is 0.005 to 0.20 amd M is selected from the group consisting of Na, Li, K, and mixtures thereof, comprising:
   (1) forming a mixture having a particle size less than 100 mesh of about 80 to about 95% by weight of said compound and about 5 to about 20% $M_2CO_3$;
   (2) melt spraying said mixture onto said substrate using a plasma spray torch.

9. A method according to claim 8 wherein M is Na.

10. A method according to claim 8 wherein said mixture is about 5 to about 10% by weight $M_2CO_3$ and about 90 to about 95% by weight of said compound.

* * * * *